United States Patent

Conway

[19]

[11] Patent Number: 5,964,161
[45] Date of Patent: Oct. 12, 1999

[54] EXPANDABLE TRAY

[76] Inventor: Kay Christine Conway, 420 Prospect St., Chatfield, Minn. 55923

[21] Appl. No.: 08/961,321

[22] Filed: Oct. 30, 1997

[51] Int. Cl.$^6$ .................................................... A47B 23/00
[52] U.S. Cl. .............................................................. 108/43
[58] Field of Search ................... 100/43, 161; 428/34.3, 428/34.6, 35.2, 35.5; 229/87.03, 101, 928; 383/120

[56] References Cited

U.S. PATENT DOCUMENTS

| | | |
|---|---|---|
| 698,600 | 4/1902 | Wallace . |
| 3,958,749 | 5/1976 | Goodrich . |
| 4,011,606 | 3/1977 | Scrafield et al. . |
| 4,126,261 | 11/1978 | Cook . |
| 4,144,968 | 3/1979 | Shelton . |
| 4,274,577 | 6/1981 | Walsh, Jr. . |
| 4,313,558 | 2/1982 | Benham . |
| 4,402,403 | 9/1983 | Focke et al. . |
| 4,494,785 | 1/1985 | Song . |
| 4,782,953 | 11/1988 | McPhee . |
| 4,811,846 | 3/1989 | Bottega . |
| 4,958,577 | 9/1990 | Demaio et al. . |
| 5,069,375 | 12/1991 | Flick . |
| 5,127,339 | 7/1992 | Hood, Jr. . |
| 5,137,210 | 8/1992 | Hibbs . |
| 5,199,792 | 4/1993 | Roosa . |
| 5,209,370 | 5/1993 | Pickett et al. . |
| 5,316,388 | 5/1994 | Caligiuri . |
| 5,332,586 | 7/1994 | DiMino . |
| 5,425,455 | 6/1995 | Miller et al. . |
| 5,470,594 | 11/1995 | DiMino . |
| 5,497,885 | 3/1996 | Sussman . |
| 5,520,119 | 5/1996 | Eisenberg . |
| 5,580,625 | 12/1996 | Capy et al. . |
| 5,743,460 | 4/1998 | Capy et al. . |

*Primary Examiner*—Jose V. Chen
*Attorney, Agent, or Firm*—Fish & Richardson P.C., P.A.

[57] ABSTRACT

An expandable tray that includes a sheet having a first edge, a second edge opposite the first edge, a first end, and a second end opposite the first end, the ends being substantially transverse to the edges. The sheet includes a plurality of oppositely folded portions disposed between the first end and the second end forming a plurality of folds extending from the first edge to the second edge, a first securement device for securing the folds in a stacked configuration near the first edge, and a second securement device for securing the folds in a stacked configuration near the second edge. The portion of the folds extending between the secured ends is movable to an expanded position to form a container defining a volume. The disclosure also features a method for protecting a surface using the expandable tray.

27 Claims, 2 Drawing Sheets

EXPANDABLE TRAY

BACKGROUND OF THE INVENTION

This invention relates to containing articles and liquids.

As life in today's society has become more mobile and fast paced, food consumption on-the-go has become more prevalent. Consumption of take-out food often takes place in a vehicle, on a park bench, or in other locations that don't provide a table or other suitable surface for food placement. Often, the food is eaten while driving in order to optimize the consumer's time. Therefore, the consumer's lap and the surrounding car interior become the primary surfaces for food placement and for capture of food particles. Unfortunately, these surfaces are easily soiled when contacted with food and beverages.

Take-out food is usually wrapped in paper, paperboard or cardboard and provided in a paper bag. Food wrappers, bags, and napkins are generally the only items available to protect the consumer and the consumer's immediate surroundings (i.e., the car interior) from becoming soiled by drips, spills and leakage from food and drink items. Wrappers, bags and napkins, however, are not well suited to protecting surfaces because they tend to slide off or refold themselves, are often too small for proper surface coverage, are liquid permeable, and permit food particles and liquids to spill out beyond their edges.

SUMMARY OF THE INVENTION

The invention features an expandable tray that includes a sheet having a first edge, a second edge opposite the first edge, a first end, and a second end opposite the first end, the ends being substantially transverse to the edges. The sheet includes a plurality of oppositely folded portions disposed between the first end and the second end forming a plurality of folds extending from the first edge to the second edge, a first securement device for securing the folds in a stacked configuration near the first edge, and a second securement device for securing the folds in a stacked configuration near the second edge. The unsecured portion of the folds is movable to an expanded position to form a container defining a volume. The folds are preferably equally dimensioned. In preferred embodiments, the sheet includes a grease impervious material. In other embodiments, the sheet includes a liquid impervious material.

Suitable sheet materials are selected from the group consisting of paper, plastic, wax coated materials, plastic coated materials, paperboard, laminates, aluminum, woven fabrics, nonwoven fabrics, and combinations thereof.

Suitable securement devices include adhesive compositions. Other suitable securement devices are selected from the group consisting of adhesive tape, staples, grommets, paper clips, binder clips, and combinations thereof.

In preferred embodiments, the sheet is generally square in shape. The portion of the folds extending between the secured ends is preferably movable to an expanded position defining a boat-like shape.

In other embodiments, the invention features an expandable tray that includes an accordion pleated sheet that includes a plurality of accordion pleats arranged in a substantially aligned stack, each of the pleats having a first end, a second end, and a midsection extending between the first and second ends, a first securement device for maintaining the first ends of the pleats in a stacked relation to each other, and a second securement device for maintaining the second ends of the pleats in a stacked relation to each other. The midsection of the pleats is being expandable to form a container defining a volume.

In another aspect, the invention features a method for protecting a surface using the above-described expandable tray. The method includes expanding the tray to form a container defining a volume and placing the expanded tray on a surface to be protected. The surface to be protected is a user's lap or the interior of a vehicle.

In other embodiments, the method further includes providing the tray in a folded configuration. In preferred embodiments, the method further includes containing a liquid or an object (e.g., a food item) within the protective tray.

The tray can be manufactured inexpensively and is disposable, and easy to use. In a folded strip configuration, the tray is compact, lightweight and easy to store and dispense. In an expanded configuration, the tray is capable of confining objects or spills, and thus is handy as, for example, a lap or vehicle seat tray when eating food, or when engaging in other activities that could soil a user's surroundings or which require containment of articles. The expandable tray is particularly useful in circumstances where a table or other surface is not available.

Other features and advantages of the invention will be apparent from the following description of the preferred embodiments thereof, and from the claims.

DESCRIPTION OF THE PREFERRED EMBODIMENTS

An expandable tray capable of expanding from a first folded configuration to a second expanded configuration and further capable of protecting surfaces from contact with food and beverages is shown in FIGS. 1–6.

Figure 1:
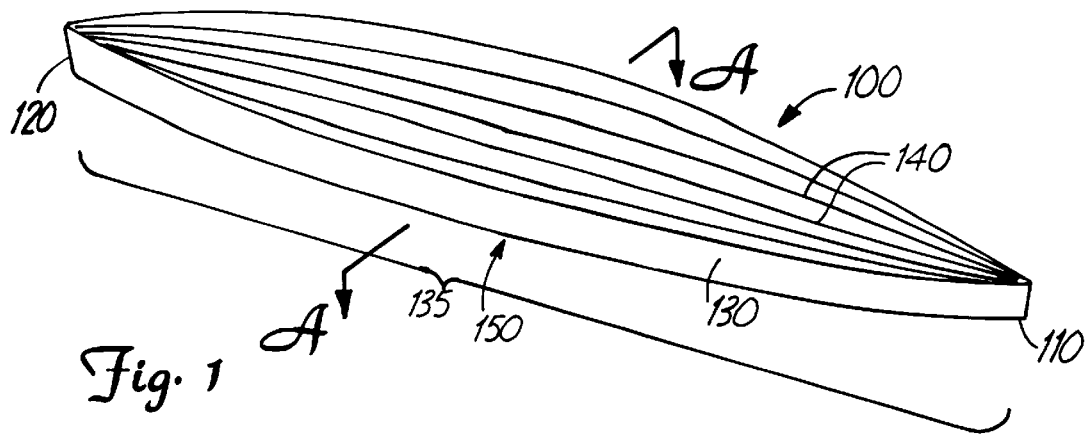
FIG. 1 is a perspective view of a slightly expanded tray of the present invention.
Figure 2:
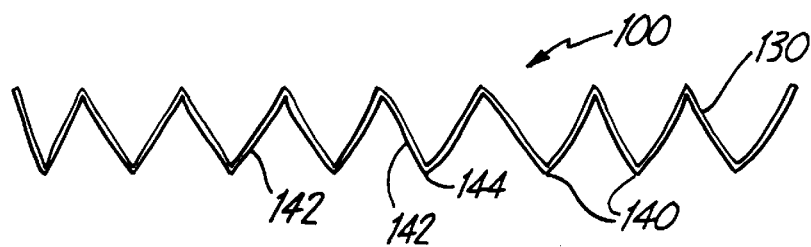
FIG. 2 is a cross-sectional view of the folds of the tray of FIG. 1, taken along line A—A.
Figure 7:
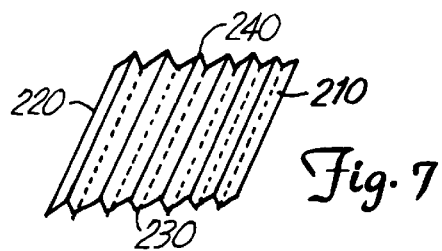
FIG. 7 is a perspective view of a sheet used in the tray of FIG. 1.

Referring to FIG. 1, tray 100 includes a sheet 130 having a plurality of folds 140 extending between and secured at a first secured end 110 and a second secured end 120. In FIG. 7, sheet 130 having two opposing edges 230, 240 and two opposing ends 210, 220 where the edges and the ends are in a substantially transverse relation to each other, is shown. In FIGS. 1 and 7, sheet 130 having a plurality of oppositely folded portions disposed between first end 210 and second end 220 forming a plurality of folds 140, is shown. The folds extend between edges 230 and 240 along a direction transverse to ends 210, 220. A cross-section taken along line A-A' of tray 100 in FIG. 1 depicting slightly extended folds 140 having side walls 142 and crease 144 is shown in detail in FIG. 2.

Figure 3:
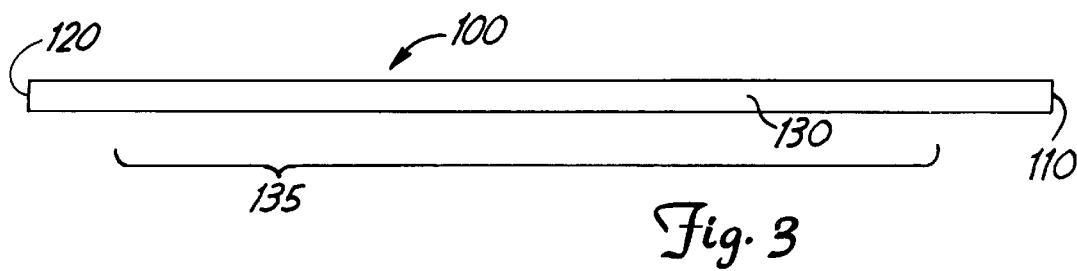
FIG. 3 is a side view of the tray of FIG. 1.
Figure 6A:
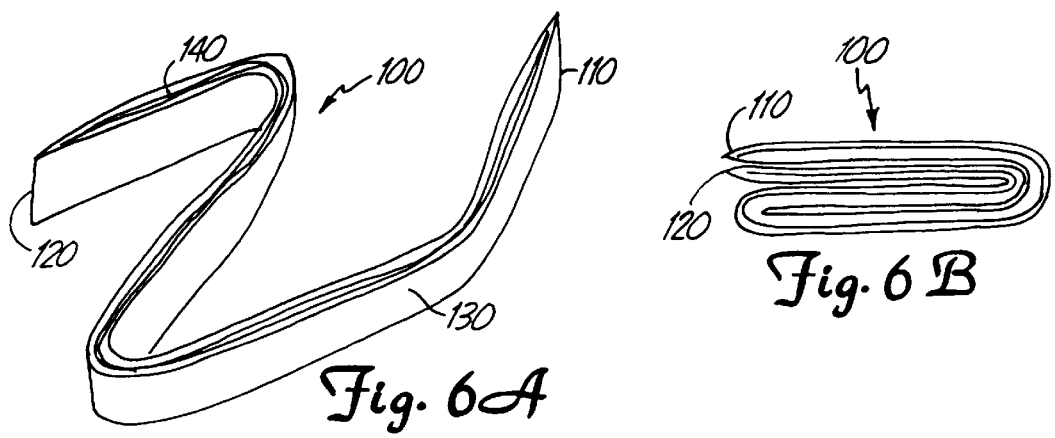
FIG. 6*a* is a perspective view of a folded strip configuration of the tray of the present invention that is partially folded.
Figure 6B:
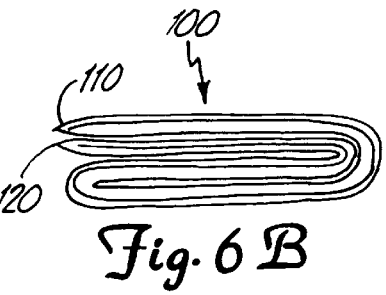
FIG. 6*b* is a top view of a folded strip configuration of the tray of the present invention that is fully folded.

The folds are preferably substantially equally dimensioned and occur at regular intervals. In FIGS. 3, 6a and 6b, tray 100 is shown in a first folded configuration. In the folded configuration, folds 140 are in a substantially parallel overlapping relationship with each other such that adjacent folds are stacked on top of each other, and side walls 142 of adjacent folds contact each other in a manner similar to a folded fan or a series of stacked accordion pleats. In the folded configuration, the folds are preferably aligned in a stack, where the stack takes a minimum volume.

Folds 140 are secured together at edges 230 and 240 by securement devices to form secured ends 110 and 120. Suitable securement devices capable of maintaining the folds 140 in fixed relation to each other include, e.g., ties (e.g, thread, string, yarn, rope, and plastic), fasteners, clips (e.g., paper clips and binder clips), grommets, staples, adhesive compositions, and adhesive tape, and combinations thereof. Alternatively or in addition ends 110 and 120 can be secured together by devices generated by, e.g., welding, heat sealing, stitching, and the like.

Midsection 135 of folds 140 extends between secured ends 110 and 120. The midsection is capable of being expanded to form a container defining an internal volume 165, 205.

Sheet 130 is preferably square in shape prior to incorporation into tray 100, but other shapes are contemplated including, e.g., rectangular, circular, and triangular. Sheet 130 can vary in size depending on the size of the desired tray 100; adult and child-sized trays 100 are an example.

Sheet 130 is constructed from materials that are capable of being folded and unfolded, and preferably capable of being repeatedly folded and unfolded without loss of structural integrity. Particularly preferred sheet materials are impermeable to liquids e.g., oil, grease, water based liquids (e.g., coffee and pop), sauces, and the like. Examples of suitable sheet materials include paper, coated paper (e.g., wax coated paper), plastic, thin paperboard, thin cardboard, laminates (e.g., paper/plastic laminates), aluminum foil, and fabric, e.g., woven and nonwoven, and combinations thereof.

Figure 4:
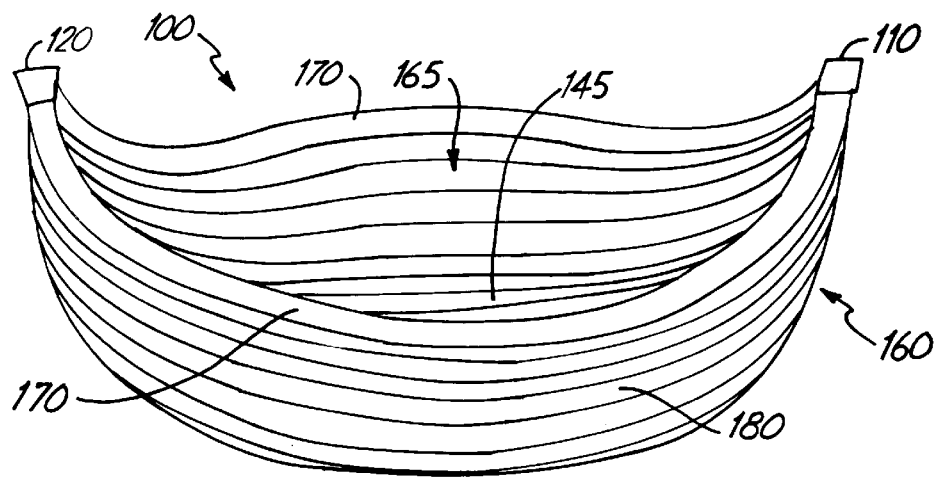
FIG. 4 is a perspective view of a fully expanded configuration of the tray of the present invention.
Figure 5:
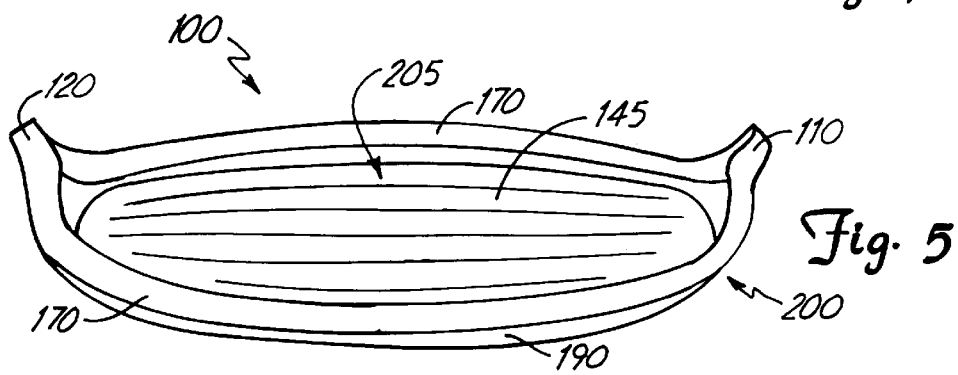
FIG. 5 is a perspective view of a partially expanded configuration of the tray of the present invention.

Tray 100 is expandable from a first folded configuration shown in FIGS. 3, 6a and 6b to a second self-supporting, semi-rigid expanded configuration shown in FIGS. 1, 4 and 5. When in the folded configuration, tray 100 forms a strip as shown in FIGS. 3, 6a and 6b. The folded tray 100 is flexible such that it can be readily folded over upon itself into a compact configuration that can be easily stored and dispensed, as shown in FIGS. 6a and 6b.

Referring to FIGS. 1, 4 and 5, tray 100 is shown in various expanded configurations in which at least some of the folds 140 are expanded such that some of the fold side walls 142 are not in contact with their adjacent fold side walls 142. In an expanded configuration, tray 100 is a self-supporting, semi-rigid structure that can maintain the expanded shape without the aid of an external force. Expanded tray 100 forms a container defining a volume capable of containing articles and, depending upon the composition of sheet 130, liquids.

The shape and configuration of expanded tray 100 can be altered to suit user preferences, for example, by altering the number of expanded folds, the degree of expansion of each fold, and the location of the expanded folds. The expanded tray can be formed into a tray having narrower or broader surface coverage, and flatter or more bowl-like containment depending on the user's requirements.

One method for achieving the expanded configuration includes extending folds 140 primarily in central region 145 of tray 100 while portions of folds 140 near secured ends 110 and 120 (see FIGS. 4 and 5) remain in a substantially folded configuration. As additional folds 140 are extended, the volume 165, 205 defined by container 160, 200 including side walls 180, 190, central region 145, and unfolded folds 170 increases as shown in FIGS. 4 and 5. Referring to FIG. 5, expansion of a portion of folds 140 results in an expanded tray 100 having a broad, flat central region 145, and lower side walls 190 (i.e., a container resembling a miniature canoe). In comparison, expansion of substantially all of folds 140 results in a tray that resembles a bowl 160 having higher sides 180, and a broad central region 145, which define a correspondingly greater volume, as shown in FIG. 4.

Tray 100 in an expanded configuration can be used to confine items such as, e.g., food and food particles; liquids, e.g., drink spills; condiment packages; discarded wrappers; art materials; toys; and the like. The expanded tray 160 or 200 can be used to protect a surface from food, drink and other items that might soil the surface by placing the tray on or near the surface. For example, the tray can be placed on a user's lap to protect both the user and the user's surroundings such as the interior of an automobile.

Expanded tray 100 can also be collapsed or refolded into the first folded configuration after which it can be reused or discarded. Expanded tray 100 can be refolded, for example, by simultaneously tugging on secured ends 110 and 120.

Tray 100 can be constructed by repeatedly folding the entire length of sheet 130 back on itself from first end 210 to second end 220 creating a stack of folds 140 that are substantially equally dimensioned and in substantially parallel relationship resulting in what is referred to as a fan-folded or accordion pleated sheet. The stack of folds 140 is then secured together near edges 230, 240 to maintain the folds in a stacked relation to each other. Securing the folds can be achieved using a variety of processes including, e.g., stapling, taping, adhering, stitching, welding, and combinations thereof.

Other embodiments are within the following claims. For example, although the expandable tray has been described as having a plurality of regular folds, the folds may occur at irregular intervals or have irregular dimensions with respect to each other (e.g., the distance from crease to crease may vary).

What is claimed is:

1. An expandable tray, comprising:
   a sheet having a first edge, a second edge opposite said first edge, a first end, and a second end opposite said first end, said ends being substantially transverse to said first and second edges,
   said sheet including a plurality of oppositely folded portions disposed between said first end and said second end forming a plurality of folds extending from said first edge to said second edge, substantially all of said folds being in an overlapping relationship with each other;
   a first securement device for securing said folds in a stacked configuration near said first edge; and
   a second securement device for securing said folds in a stacked configuration near said second edge,
   the portion of said folds extending between the secured ends being movable to an expanded position to form a container defining a volume.

2. The tray of claim 1, wherein said folds are substantially equally dimensioned.

3. The tray of claim 1, wherein said sheet comprises a liquid impervious material.

4. The tray of claim 1, wherein said sheet comprises a grease impervious material.

5. The tray of claim 1, wherein said sheet comprises a material selected from the group consisting of paper, plastic, wax coated materials, plastic coated materials, paperboard, laminates, aluminum, woven fabrics, nonwoven fabrics, and combinations thereof.

6. The tray of claim 1 wherein said first and second securement devices comprise an adhesive composition.

7. The tray of claim 1, wherein said first and second securement devices are selected from the group consisting of adhesive tape, staples, grommets, paper clips, binder clips, and combinations thereof.

8. The tray of claim 1, wherein said sheet comprises a square shape.

9. The tray of claim 1, wherein said portion of said folds extending between the secured ends is movable to an expanded position defining a boat-like shape.

10. An expandable tray comprising:
    an accordion pleated sheet comprising a plurality of accordion pleats arranged in a substantially aligned stack, each of said pleats having a first end, a second end, and a midsection extending between said first and second ends, a first securement device for maintaining said first ends of said pleats in a stacked relation to each other;
    a second securement device for maintaining said second ends of said pleats in a stacked relation to each other, and
    said midsection of said pleats being expandable to form a container defining a volume.

11. The tray of claim 10, wherein said folds are substantially equally dimensioned.

12. The tray of claim 10, wherein said sheet comprises a liquid impervious material.

13. The tray of claim 10, wherein said sheet comprises a grease impervious material.

14. The tray of claim 10, wherein said sheet comprises a material selected from the group consisting of paper, plastic, wax coated materials, plastic coated materials, paperboard, laminates, aluminum, woven fabrics, nonwoven fabrics, and combinations thereof.

15. The tray of claim 10, wherein said first and second securement devices comprise an adhesive composition.

16. The tray of claim 10, wherein said first and second securement devices are selected from the group consisting of adhesive tape, staples, grommets, paper clips, binder clips, and combinations thereof.

17. The tray of claim 10, wherein said sheet comprises a square shape.

18. The tray of claim 10, wherein said midsection of said pleats extending between the secured ends is movable to an expanded position defining a boat-like shape.

19. A method for protecting a surface using an expandable tray, the tray comprising a sheet having a first edge, a second edge opposite said first edge, a first end, and a second end opposite said first end, said ends being substantially transverse to said first and second edges,
    said sheet including a plurality of oppositely folded portions extending from said first end to said second end forming a plurality of folds extending from said first edge to said second edge substantially all of said folds being in an overlapping relationship with each other,
    a first securement device for securing said folds in a stacked configuration near said first edge, and
    a second securement device for securing said folds in a stacked configuration near said second edge,
    the portion of said folds extending between the secured ends being movable to an expanded position to form a container defining a volume,
    the method comprising:
    a) expanding said tray to form a container defining a volume; and
    b) placing said expanded tray on a surface to be protected.

20. The method of claim 19, further comprising providing said tray in a folded configuration.

21. The method of claim 19, further comprising containing a liquid within said protective tray.

22. The method of claim 19, further comprising containing an object within said protective tray.

23. The method of claim 22, wherein said object comprises a food item.

24. The method of claim 19, wherein the surface to be protected is a user's lap.

25. The method of claim 19, wherein the surface to be protected is an interior of a vehicle.

26. The tray of claim 1, wherein each of said folds is defined by side walls, said side walls being substantially equally dimensioned.

27. The tray of claim 1, wherein said plurality of folds is capable of being arranged in a substantially aligned stack of overlapping folds.

* * * * *